UNITED STATES PATENT OFFICE 2,449,130

ACID CHROMABLE MONOAZO DYESTUFFS AND A PROCESS OF MAKING SAME

Adolf Krebser, Riehen, and Werner Kuster, Basel, Switzerland, assignors to J. R. Geigy A. G., Basel, Switzerland, a Swiss firm No Drawing. Application March 10, 1945, Serial No. 582,184. In Switzerland November 23, 1943

Section 1, Public Law 690, August 8, 1946
Patent expires November 23, 1963

6 Claims. (Cl. 260—199)

It has been found that valuable wool dyestuffs are obtained by diazotising amines of the general formula

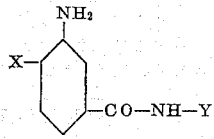

wherein X means a $SO_3H$-group or a $SO_2$-aryl-group and Y means a mono- or polynuclear o-hydroxy-carboxy-phenyl radical, and acid coupling the same with amino-hydroxynaphthalene sulfonic acids of the general formula

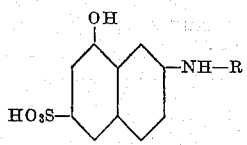

wherein R means hydrogen or an alkyl radical.

The new dyestuffs dye wool from an acid bath in vivid red shades which, by an after-chromation, scarcely change their shades, but become substantially improved with regard to their fastness properties. The diazo components used for the production of these dyestuffs are obtained by condensing o-hydroxy-carboxy compounds of the benzene series containing amino groups, in presence of acid binding agents, with a 4-halogeno-3-nitrobenzoyl halide which may be further substituted, or by first substituting the 4-positioned halogen of the benzoic acid aryl compound, by means of sodium sulfite, by the sulfonic acid group or, by means of aryl sulfinic acid salts, by the aryl sulfone radical and finally reducing the same to the corresponding 3-amino-4-sulfobenzoic acid-o-hydroxy-carboxy-arylides or 3-amino-4-arylsulfobenzoic acid - o - hydroxy-carboxy-arylides. As o - hydroxy-carboxy compounds of the benzene series may be understood for instance: 3- and 5-amino-2-hydroxy-benzoic acids, 3-amino-5-methyl-2-hydroxybenzoic acid, 5-amino - 3 - methyl - 2 - hydroxybenzoic acid, 5-amino - 4 - methyl - 2 - hydroxybenzoic acid, 3-amino-5-sulfo-2-hydroxybenzoic acid, 5-amino-3-sulfo - 2 - hydroxybenzoic acid, 4'-amino-3-methyl-4-hydroxy-diphenylmethane-5-carboxylic acid, 3''-amino-2:2'-dihydroxy-5:5'-dimethyl-triphenylmethane-3:3'-dicarboxylic acid and the like.

The present invention may now be illustrated, but not limited, by the following, wherein the parts are by weight, unless otherwise stated.

*Example*

70.4 parts of 3-(3'-amino-4'-sulfobenzoyl)-amino-2-hydroxybenzoic acid are dissolved in neutral condition in 700 parts of water by means of sodium carbonate, intermixed with 200 parts of n-nitrite and, within half an hour, added to 70 parts by volume of concentrated hydrochloric acid in 300 parts of water, the temperature being not allowed to rise above 5°-7° C. Thus, the greatest part of the diazonium compound is precipitated. After complete diazotization a solution of 47.8 parts of 2-amino-8-hydroxynaphthalene-6-sulfonic acid in 500 parts of water being slightly acid to litmus is added slowly to the obtained suspension. After completion of the dyestuff formation the whole is neutralised, heated to 80° C., treated with 10% of sodium chloride and, after cooling to 20° C., filtered. When dried, the dyestuff constitutes a red powder which is easily soluble in warm water and which dyes wool from an acid bath in vivid red shades becoming somewhat more bluish on after-chroming.

Instead of 3-(3'-amino-4'-sulfobenzoyl)-amino-2-hydroxybenzoic acid also other diazo components, such as 5-(3'-amino-4'-sulfobenzoyl)-amino-2-hydroxybenzoic acid, 5-(3'-amino-4'-sulfobenzoyl) - amino-3-methyl-2-hydroxybenzoic acid, 5-(6'-chloro-3'-amino-4'-sulfobenzoyl)-amino-2-hydroxybenzoic acid, 4'-(3''-amino-4''-sulfobenzoyl)-amino-3-methyl - 4 - hydroxydiphenyl-methane-5-carboxylic acid, 3''-(3'''-amino-4'''-sulfobenzoyl)-amino - 2:2' - dihydroxy-5:5'-dimethyltriphenylmethane-3:3'-dicarboxylic acid, and the like may be used.

What we claim is:

1. A process for the manufacture of an acid chromable monoazo dyestuff which comprises coupling in an acid solution 2-amino-8-hydroxy-naphthalene-6-sulfonic acid of the formula

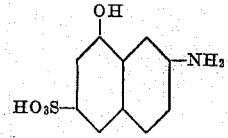

with a diazotised amine of the formula

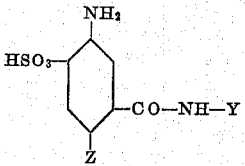

wherein Y stands for a radical of the benzene series containing at least one o-hydroxy-carboxy grouping, and Z means a member selected from the group consisting of H and Cl.

2. A process for the manufacture of an acid chromable monoazo dyestuff which comprises coupling in an acid solution 2-amino-8-hydroxy-naphthalene-6-sulfonic acid with the diazotised amine of the formula

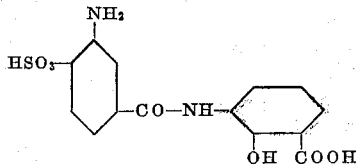

3. A process for the manufacture of an acid chromable monoazo dyestuff which comprises coupling in an acid solution 2-amino-8-hydroxy-naphthalene-6-sulfonic acid with the diazotised amine of the formula

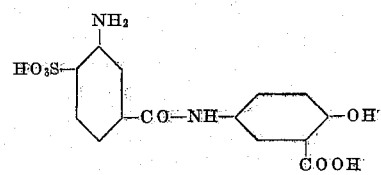

4. An acid chromable monoazo dyestuff of the formula

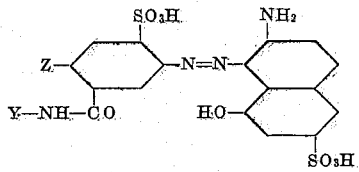

wherein Y stands for a radical of the benzene series containing at least one o-hydroxy-carboxy grouping and Z means a member selected from the group consisting of H and Cl, being a bluish red powder and dyeing wool in red shades remaining nearly unaltered when afterchromed.

5. The acid chromable monoazo dyestuff of the formula

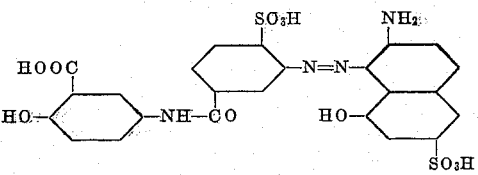

being a carmine-red powder dissolving in water with carmine-red color, in sulfuric acid with orange color and dyeing wool in red shades remaining nearly unaltered when afterchromed.

6. The acid chromable monoazo dyestuff of the formula

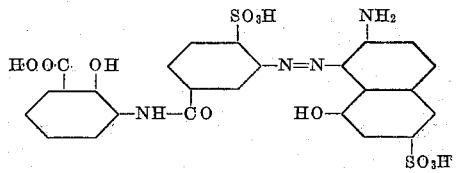

being a carmine-red powder dissolving in water with carmine-red color, in sulfuric acid with red-orange color and dyeing wool in red shades remaining nearly unaltered when afterchromed.

ADOLF KREBSER.
WERNER KUSTER.

REFERENCES CITED

The following references are of record in the file of this patent:

UNITED STATES PATENTS

| Number | Name | Date |
|---|---|---|
| 2,232,870 | Roos | Feb. 25, 1941 |

FOREIGN PATENTS

| Number | Country | Date |
|---|---|---|
| 457,840 | France | July 23, 1913 |
| 648,769 | Germany | Aug. 7, 1937 |